United States Patent [19]
Harker

[11] 3,906,923
[45] Sept. 23, 1975

[54] PISTON AND CYLINDER CONSTRUCTION
[75] Inventor: Harry E. Harker, Hope, Ind.
[73] Assignee: Cummins Engine Company, Inc., Columbus, Ind.
[22] Filed: Dec. 10, 1973
[21] Appl. No.: 423,269

[52] U.S. Cl. ......... 123/193 CP; 123/193 P; 92/212; 92/219; 92/224; 92/213; 29/156.5 R
[51] Int. Cl.² .......................................... F02F 3/00
[58] Field of Search ............... 123/193 P, 193 CP; 29/156.5 R, 156.6; 92/224, 219, 212, 213

[56] References Cited
UNITED STATES PATENTS

| | | | |
|---|---|---|---|
| 1,228,048 | 5/1917 | Rich | 123/193 P |
| 1,727,390 | 9/1929 | Best et al. | 92/224 X |
| 1,875,039 | 8/1932 | Leeak | 92/224 X |
| 1,979,498 | 11/1934 | Short | 92/224 X |
| 2,208,898 | 7/1940 | Eichelberger | 92/224 X |
| 2,806,751 | 9/1957 | Sykes | 92/224 X |
| 2,817,562 | 12/1957 | Fleming et al. | 92/212 X |
| 3,051,536 | 8/1962 | McLean et al. | 92/224 |
| 3,220,101 | 11/1965 | Roy | 29/156.5 R X |
| 3,405,610 | 10/1968 | Hill et al. | 92/213 X |

FOREIGN PATENTS OR APPLICATIONS
617,931   2/1927   France ..................... 92/212

*Primary Examiner*—Charles J. Myhre
*Assistant Examiner*—William C. Anderson

[57] ABSTRACT

A piston and cylinder construction for an internal combustion engine is provided wherein the severity of the vibrations of the reciprocating piston and cylinder have been effectively reduced to such an extent that the wear life of the piston and cylinder has been significantly prolonged. The piston carries a replaceable insert which is possessed of substantial conformability without loss of integrity, and thus remains in continuous sliding engagement with the cylinder wall thereby preventing lateral displacement of the piston within the cylinder. By reducing the severity of the vibrations, cavitation of the exterior surface of the cylinder is retarded to such an extent as to no longer present a problem.

20 Claims, 11 Drawing Figures

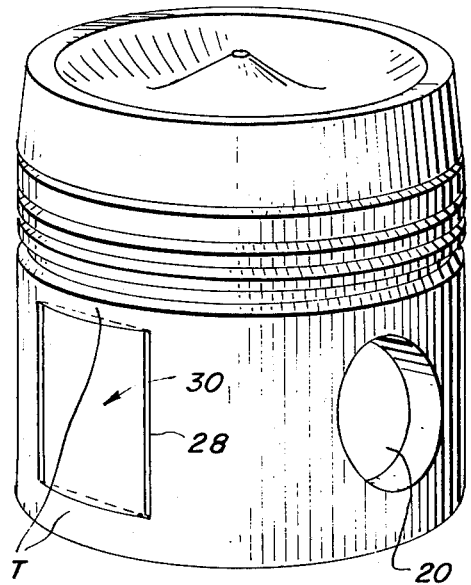
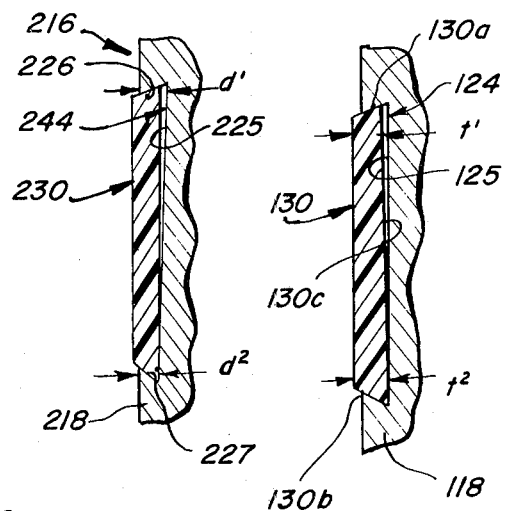
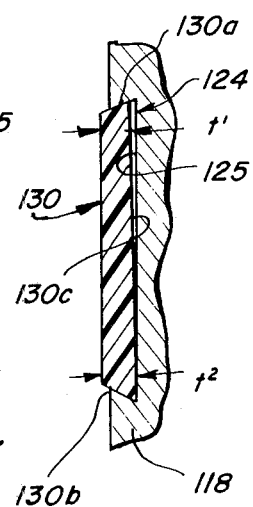
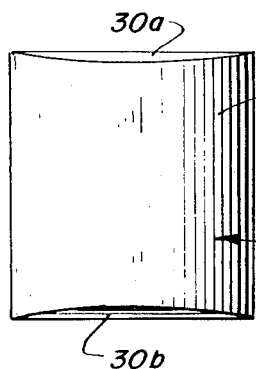
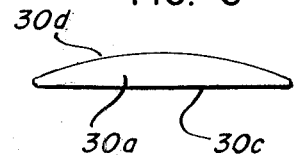
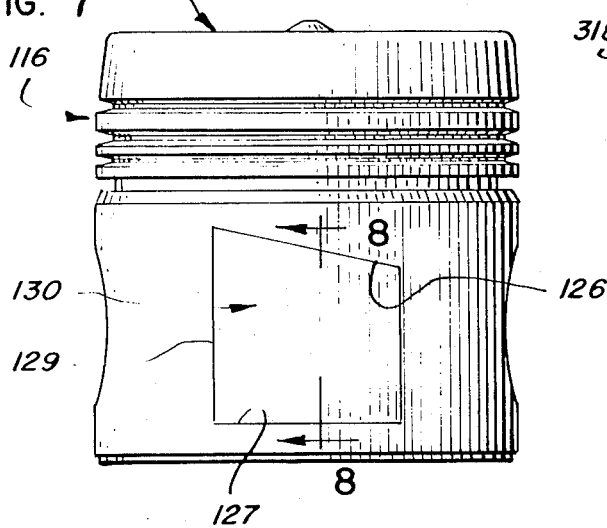
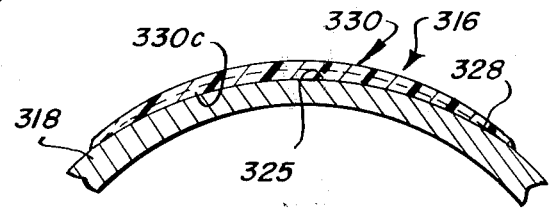
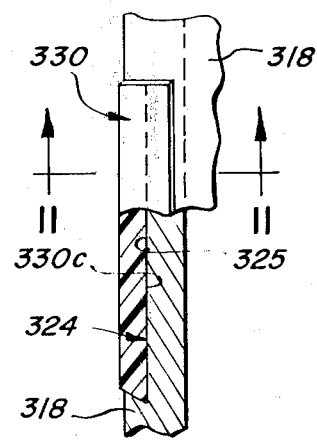

PISTON AND CYLINDER CONSTRUCTION

BACKGROUND OF THE INVENTION

Heretofore, in piston-type internal combustion engines, severe vibrations caused by substantial lateral displacement of the piston due to side loading thereof during operation of the engine have always been a problem resulting in: (a) undue wear of both the piston and cylinder components, thereby necessitating frequent replacement of parts and an inordiante amount of downtime for maintenance and service; (b) loss of engine power; and (c) the production of an undesirable noise level during operation of the engine.

Heretofore, in an effort to overcome these problems, various anti-wear coatings were sometimes applied to the piston and/or the interior or exterior surface of the cylinder, or both; in other instances, the piston and cylinder were carefully machined so as to fit more closely when assembled; and in still other situations, inserts, bands or wear pads of various shapes and sizes were mounted in numerous locations on the exterior of the piston. None of these approaches towards overcoming the problems have proved effective because of one or more of the following reasons: (1) the coatings did not control cavitation of the cylinder liner or reduce sound level and were costly, difficult to apply and had poor bonding characteristics when subjected to the high temperatures and pressures normally encountered during operation of a high-speed engine, (2) careful machining of the components was too costly and was ineffective in many instances because of th tolerances to compensate for the differential in thermal expansion of the piston components during operation of the engine; (3) the inserts, bands or pads were difficult to install and replace, oftentimes causing defacement of the piston surface and required special shaping or machining of the inserts, bands or pads after they had been installed on the piston exterior; (4) sufficient wear material could not be properly oriented on the piston exterior so as to provide consistent and substantial control; and (5) failure to provide sufficient clearance for the thermal expansion of the piston components resulted in piston, piston ring and liner scuffing.

In heavy duty diesel engines, for example, cylinder liners are normally utilized and it is customary that only one end thereof is fixedly mounted on the engine block while the remainder of the liner is substantially unsupported. A plurality of seal rings encompass a portion of the liner exterior adjacent the unsupported end thereof and contact an adjacent segment of the bore formed in the block to accommodate the liner. The exterior of the liner, the adjacent segment of the block bore and the seal rings cooperate with one another to form a narrow chamber or jacket for liquid coolant. In such a construction there is an amplification of vibratory forces imparted to the liner by the reciprocating piston, and this, in turn, causes numerous serious problems, such as excessive and accelerated cavitation of the exterior surface of the cylinder liner exposed to the liquid coolant.

SUMMARY OF THE INVENTION

Thus, it is an object of the invention to provide a piston cylinder construction which is not beset with any of the aforenoted problems.

It is a further object of the invention to provide a piston and cylinder construction wherein cavitation of the wet surface of a cylinder liner is markedly reduced, thereby prolonging significantly the wear life of teh liner and associated parts.

It is a further object of the invention to provide a piston and cylinder construction utilizing an insert mounted on the piston which is adapted to be in continuous sliding engagement with the cylinder wall, thereby minimizing vibration between the piston and cylinder wall and significantly reducing the noise level produced during operation of the piston, and yet, may be installed on or removed from the piston exterior without requiring any tools, and without defacing of the piston surface. Furthermore, the insert may be installed on or removed from the piston without requiring the piston to be completely disassembled from the cylinder.

It is still a further object of the invention to provide a replaceable piston insert which is capable of substantially conforming without loss of intergrity to the configuration of the cylinder wall the piston and cylinder are operatively assembled, and which retains its integrity and is substantially conformable when subjected to high temperatures and pressures normally encountered during operation of the engine.

It is still further object of the invention to provide an insert of the type described which may be accurately formed when separated from the piston.

It is still further object of the invention to provide a replaceable piston insert which is of a simple geometric configuration and is adapted to fit within a slot formed on the exterior of the piston by a simple and conventional machining operation.

It is a still further object of the invention to provide a piston having a slot formed in the exterior thereof which is adapted to readily accommodate a preformed insert and retain same in a relatively fixed position therein once the piston and cylinder are in assembled relation.

It is a still further object of the invention to provide a replaceable piston insert which, when installed on the piston, will not interfere with the installation and operation of other piston components such as seal rings, connectings pins, etc.

It is an additional object of the invention to provide a replaceable piston insert which may be contoured so as to be installed on pistons varying in size and shape over a wide range.

Further and additional objects will appear from the description, accompanying drawings and appended claims.

In accordance with one embodiment of the invention, a piston and cylinder liner for an internal combustion engine is provided wherein the exposed surface of the depending skirt of the piston has a thrust area in which a slot is formed. The slot is delimited by undercut closed top and bottom edges and opposed open sides. Disposed within the slot is an insert which remains in a substantially fixed position therein when the piston and cylinder are in operatively assembled relation. The insert may be positioned within or removed from the slot, without the need for tools, when the piston assumes a position relative to the cylinder liner wall wherein the open side of the slot is free from said wall — that is to say, the slot open side is not opposite the cylinder liner wall. The insert has substantial conformability without loss of integrity and is in continuous sliding engagement with the liner wall, and thus, minimizes vibration of the piston and cylinder liner.

DESCRIPTION

For a more complete understanding of the invention, reference should be made to the drawings, wherein:

FIG. 1 is a perspective view of one form of the improved piston and insert assembly.

FIGS. 4, 5 and 6 show respectively front, side and top views of one form of an insert.

FIG. 7 is a side elevational view on a reduced scale on a second form of the improved piston and insert assembly.

FIG. 8 is an enlarged sectional view taken along line 8—8 of FIG. 7.

FIG. 9 is similar to FIG. 8 but showing a third form of the improved piston and insert assembly.

FIG. 10 is an enlarged fragmentary side elevational view, partially in section, of a fourth form of the improved piston and insert assembly.

FIG. 11 is a sectional view taken along line 11—11 of FIG. 10.

Figure 2:
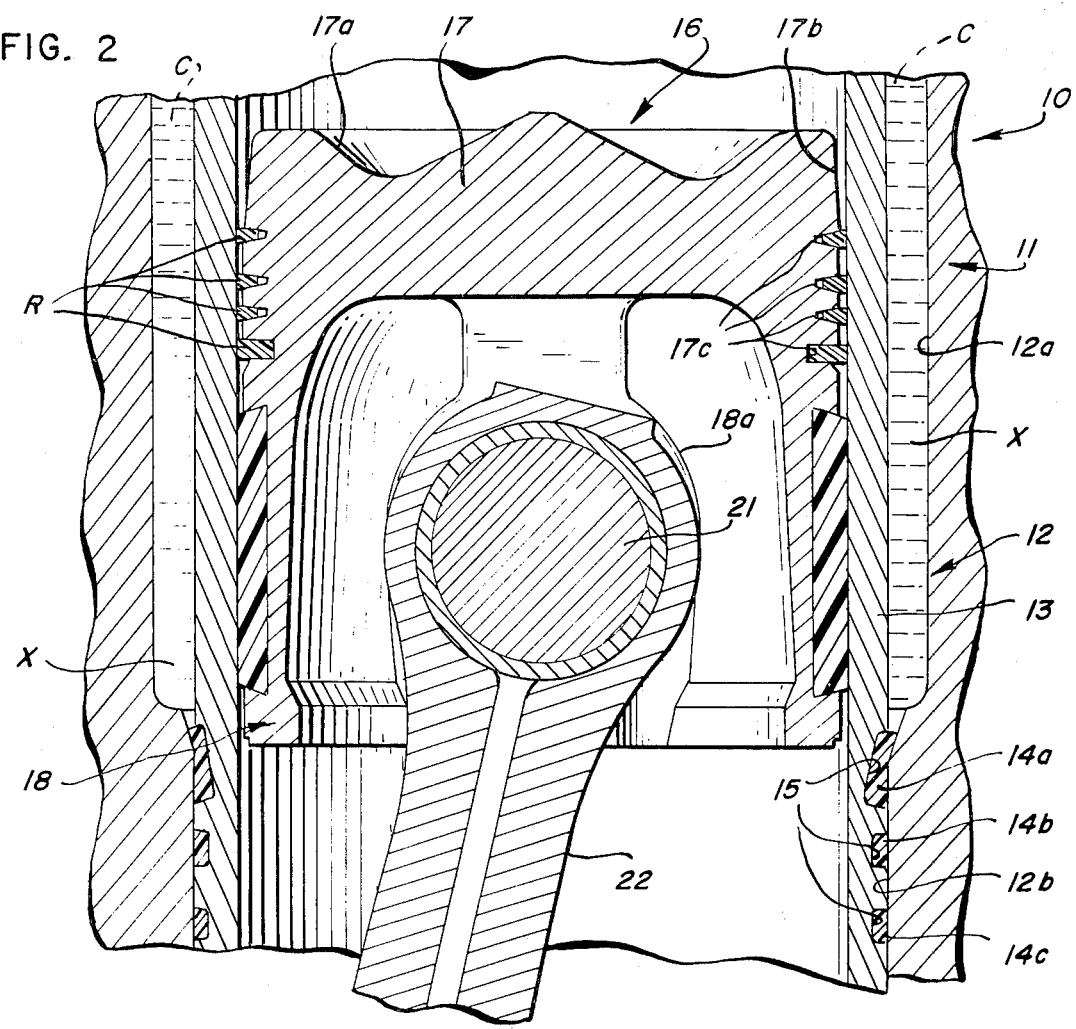
FIG. 2 is an enlarged fragmentary sectional view of the improved piston and insert assembly of FIG. 1 and a cylinder liner embodied in an internal combustion engine, the section being taken longitudinally of the cylinder liner and normal to the pin connecting the rod and piston head.

Referring now to the drawings, and more particularly to FIG. 2, a portion of an internal combustion engine 10 is shown which includes an engine block 11 in which a plurality of bores 12, only one being shown, are formed. The inner end of each bore opens into a crankcase cavity, not shown, formed within the block. A metallic cylinder liner 13 is positioned within each bore, and in most installations, only the upper end portion of the liner, not shown, is fixedly secured to the block and the remainder of the liner is substantially unsupported. As seen in FIG. 2, a portion 12a of the bore 12 has an enlarged diameter and cooperates with the unsupported portion of the liner to form a narrow chamber X which encompasses the liner and is filled with a suitable liquid coolant C. The coolant is caused to be circulated through the chamber X when the engine is operating. The lower portion 12b of the bore 12 has a smaller diameter which closely approximates the outside diameter of the liner. Suitable seal rings 14a, b and c are carried within grooves 15 formed in the exterior surface of the liner. The rings are compressed by the adjacent surface of the bore and serve to provide an effective seal for the lower end of the jacket. The ring and groove arrangement may be similar to that disclosed in U.S. Pat. No. 3,403,661, issued Oct. 1, 1968.

Mounted for reciprocatory movement within the liner 13 is a piston 16. The piston is formed of a suitable metal alloy and includes a crown section 17 having a contoured upper surface 17a against which the driving forces generated by combustion of the fuel entrapped above the piston are directed. The exposed annular side surface 17b of the crown section is provided with a series of grooves 17c in which are accomodated a plurality of conventional seal rings R formed of a suitable metallic material. The number of rings to be carried by the crown section will depend upon many factors, such as piston speed, shape of ring and groove, the materials of which the various components are made, etc.

Figure 3:
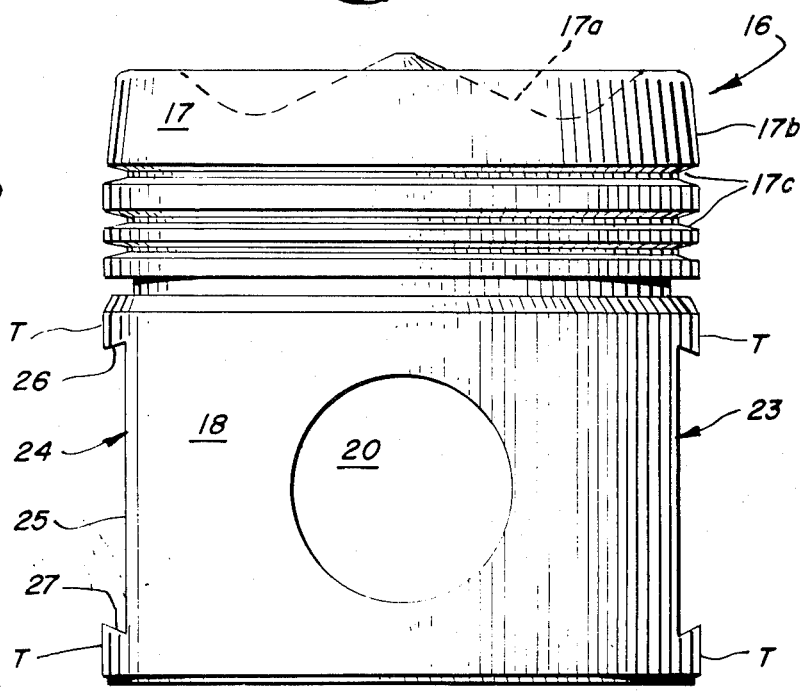
FIG. 3 is a side elevational view of the piston of FIG. 1, and showing the configuration of the open sides of the slots with the inserts therefor removed.

Depending from the crown section and delimiting the underside thereof is a skirt section 18. Formed on the interior surface of the skirt section 18 is a pair of oppositely disposed gudgeon or wrist pin bosses 18a. The bosses are provided with aligned openings 20 which terminate at the exterior surface of the skirt section, see FIGS. 1 and 3. The axis of the aligned openings is disposed transversely of the direction of movement of the piston within the cylinder. The openings accommodate and support the ends of a wrist pin 21, which serves to pivotally interconnect the piston 16 to the upper end of a connecting rod 22. The opposite end of the rod 22 is connected to a crankshaft, not shown, disposed within the afore-mentioned crankcase cavity.

Besides the wrist pin openings 20, the skirt section 18 is provided with a pair of diametrically opposed slots 23 and 24, which may be of like configuration. The alignment of the slots is normal to the alignment of the openings 20. The location of the slots on the skirt section is preferably in thrust areas T — that is to say, where the greatest concentration of laterally displaceable (side load) forces are imparted to the piston during operation of the engine.

Each slot in the illustrated embodiment is provided with a planar base 25 delimited at the top and bottom by closed undercut edges 26 and 27, respectively. The remainder of the base 25 is delimited by opposed open sides 28.

It will be noted that the height (longitudinal length) of the slot is appreciably less than the length of the skirt section. This is important so that the top and bottom edges 26 and 27 will have sufficient strength to prevent relative vertical movement of a replaceable insert 30 accommodated within the slot during reciprocatory movement of the piston.

In a like manner, it is also important that the sides 28 of the slot be open and terminate at the exterior surface of the skirt section. By having the opposed sides of the slot open, machining or forming of the slot is greatly simplified and involves the utilization of standard and well-known machining techniques. Secondly, as will be discussed more fully hereinafter, the open slot sides permit the insert 30 to be slipped into or removed from the slot by a simple manual manipulation requiring no tools whatsoever. The configuration of the slots 23 and 24 is such that they do not impair the overall structural strength of the piston.

FIGS. 4–6 illustrate a preferred embodiment of the insert 30 which has a simple geometric configuration resembling substantially a spherical segment of a cylinder. The top and bottom edges 30a and 30b, respectively, are beveled or otherwise contoured to conform to the shape of the corresponding undercut edges 26 and 27 of the slots 23 and 24. The back surface 30c of the insert is planar and substantially coincident to the base surface 25 of the slot. The outer surface 30d of the insert has a curvature conforming substantially to the curvature of the outer surface of the skirt section, but protrudes outwardly a slight amount (e.g., 0.002/0.005 inch) from the exterior surface of the skirt section.

The insert should be formed of a material possesed of good conformability without loss of integrity when subjected to high temperatures and pressures normally encountered during operation of the engine. In addition, the insert material should have a low coefficient of friction. In general, organic polymers display the desired properties for the insert material. Of these it has been found that arylene sulfides, heterocyclic aromatic polyamides. polyimides and flourine-containing polymers perform satisfactorily as the insert with the latter two representing preferred choises.

Including selected additives in these polymers will produce inserts with particularly desirable characteristics. Lubricants such as graphite, molybdenum disulfide or fibrous materials, such as glass, within the polymer retard erosion of the insert due to its continuous motion along the piston wall. Metal powders such as bronze appear to help conduct heat from the insert while providing it with greater bearing capability and avoiding its extrusion into the cylinder. An insert formed from polytetrafluoroethylene filled with bronze powder and molybdenum disulfide has provided improved engine performance in actual use.

Positioning the insert into the slot, or removing it therefrom, requires only that the piston be moved relative to the upper or outer end of the liner so that one of the open sides 28 of the slot is completely free of the liner whereupon the insert 30 may be readily slipped into or out of the slot. Once the insert 30 is aligned within the slot, the piston may be returned to its assembled position within the liner. While the piston and liner are in assembled relation, the insert remains locked in the slot. The extent to which the insert protrudes from the exterior surface of the piston skirt section should be such that a snug fit will result between the liner and the outer surface 30d of the insert. By reason of such a fit, the insert material will conform more readily to the liner wall as the piston reciprocates within the liner.

By having an insert on opposite sides of the wrist pin 21, a more balanced connection is attained between the piston and rod.

FIGS. 7 and 8 illustrate a second form of an improved piston 116 and a second form of an insert 130 assembled thereon.

Portions of piston 116 and insert 130 which are similar to corresponding portions of piston 16 and insert 30 will hereafter be identified by like numerals except in a one-hundred series. Insert 130 differs from insert 30 in that the thickness $t^1$ (see FIG. 8) of the upper portion of the insert 130 adjacent the crown section 117 of the piston is slightly less (e.g. 0.001 inches) than the thickness $t^2$ of the lower portion of the insert. By reason of the thickness differential there is initially a slight clearance between the backside 130 of the upper portion of insert 130 and the planar base surface 125 of the slot 124. The slight clearance is provided to compensate for the greater thermal expansion which might occur in the upper portion of the insert when the piston is reciprocating in the liner. Because the upper portion of the insert is disposed closer to the combustion chamber for the piston, it will be exposed to greater heat concentration and thus will be susceptible to greater thermal expansion.

To prevent insert 130 being inproperly positioned within slot 124, the upper and lower bevelled edges 126 and 127, respectively, of the slot 124 and the corresponding edges 130a and 130b of the insert are disposed in a non-parallel relation, as seen in exaggerated relation in FIG. 7. Thus, with piston 116, insert 130 is assembled in or disassembled from slot 124 only from the left open side 129.

FIG. 9 discloses a third form of piston 216 and insert 230. The slot 224 formed in the thrust area of the skirt section 218 has a greater depth $d^1$ adjacent the upper bevelled edge 226 than the depth $d^2$ adjacent the lower bevelled edge 227. The depth differential may be approximately 0.001 inches. Thus, the plane of the base surface 225 is not parallel to the direction of movement of the piston within the cylinder liner. Insert 230 will have no thickness differential between the upper and lower portions and, thus, insert 30 and 230 may be substantially the same.

A fourth form of piston 316 and insert 330 are shown in FIGS. 10 and 11. The slot 324 formed in the thrust area of the skirt section 318 of the piston 316 has a convex base surface 325 rather than a planar base surface as disclosed with respect to the previously defined slots 24, 124 and 224. The backside 330c of the insert 330 is provided with a concave configuration which is compatible to the convexity of base surface 325. Thus, insert 330, as in the case of insert 30, may be assembled in or disassembled from the slot 324 from either open side 328 thereof when the piston 316 has been withdrawn from the cylinder liner a sufficient amount so that the open sides of the slot are free from the interior wall of the liner. It will be noted in FIG. 11 that center of curvature of the slot base surface is not the same as the center of curvature of the exterior of the remainder of the skirt portion 318 and, thus, relative movement of the insert within the slot is avoided once the insert has been assembled in the slot and the piston and insert have been assembled in the cylinder liner.

Engines presently in the field in which the pistons and cylinder liners thereof are beset with an inordinate amount of weat can be modified and the operation thereof markedly improved by merely removing the piston from the block, and machining the skirts thereof, so as to form in the thrust areas of the skirts suitable slots to accommodate one of the inserts previously described. As aforementioned, in view of the simple configuration of the slots, the machining of the piston skirt can be accomplished by utilizing conventional equipment and known techniques. Once the slots have been formed, the inserts are manually slipped sidewise into the slots without the need for special tools, or the use of rivets or adhesives, and then the piston is reassembled in the cylinder liner. If cavitation of the wet surface of the cylinder liner has previously occurred, the latter should be replaced within the block before the piston is reassembled therein.

Thus, it will be noted that a method and structure have been provided which effectively reduce the vibratory forces produced within a piston-type internal combustion engine so that wear, noise, and attended problems are significantly reduced and cavitation of the wet surface of the cylinder liner is eliminated. The utilization of inserts of simple geometric configuration permits ready installation or replacement thereof on the piston without the need for any tools whatsoever, and also enables the inserts to be accurately shaped or formed while removed from the piston. The slots formed on the exterior of the piston require only a simple machining operation to be performed.

I claim:

1. In an internal combustion engine having a cylinder liner with the exterior surface thereof defining a wet wall of an encompassing chamber for a liquid coolant, and a reciprocating piston disposed within said liner and being provided with a depending skirt section having a thrust area formed on the exterior thereof; a method of preventing cavitation on the wet surface of the liner, comprising mounting an insert on the thrust area of the exterior of the skirt section by laterally sliding said insert relative to said skirt section while the piston and cylinder liner are in substantially disassembled relation, and assembling the piston within the cylinder liner so that the insert snugly engages in continuous sliding contact the liner interior surface to restrain lateral displacement of the piston relative to the cylinder liner during reciprocatory movement of the piston and insert as a unit within the cylinder liner.

2. The method of claim 1 including forming a transversely extending slot on the exterior of the skirt section in the thrust area whereby the slot has a recessed base surface delimited by a pair of opposed open sides and closed undercut top and bottom edges; and shaping the insert to conform substantially to the slot configuration whereby said insert is movable into or removable from the slot only through an open side thereof when said piston is in a position relative to the cylinder liner wherein the slot open side is free from the cylinder liner; said insert being substantially immovable relative to said slot when said piston reciprocates within the cylinder liner.

3. In an internal combustion engine having an elongated cylinder liner with an exterior surface thereof defining a wet wall of an encompassing chamber for a liquid coolant, and a piston mounted for reciprocatory movement within the cylinder liner and having a depending skirt section provided with a thrust area; means for preventing cavitation of the liner wet wall during reciprocatory movmement of the piston, said means comprising an insert for mounting on said skirt section thrust area and being movable therewith as a unit when the piston is reciprocating within the liner and being removable from said thrust area only upon lateral sliding movement of said insert independently of said skirt section when said piston is disposed relative to said cylinder whereby said thrust area is beyond the end limit of said liner, said insert having a portion thereof for extending beyond the skirt section exterior and effecting a continuous sliding engagement with an interior surface of the liner to restrain lateral displacement of the piston relative to the liner interior surface during reciprocation of said piston.

4. The anti-cavitation means of claim 3 wherein said insert is substantially conformable without loss of integrity to the configuration of the liner interior surface, when subjected to predetermined operating temperatures and pressures of the engine.

5. The anti-cavitation means of claim 3 wherein the thrust area of the piston skirt section is provided with a transversely extending slot having a base surface delimited by a pair of opposed open sides and closed undercut top and bottom edges; said insert being adapted to be carried within said slot and movable as a unit therewith, said insert being removable from the slot only when the piston is moved relative to the liner to a position wherein an open side of the slot is free from the liner wall whereupon said insert is only movable sidewise through the slot open side.

6. The anti-cavitation means of claim 5 wherein the piston skirt is provided with a second slot of like configuration disposed opposite the first-mentioned slot and a second insert of like configuration is disposed within the second-mentioned slot.

7. In an internal combustion engine having and elongated cylinder and a piston mounted therein for reciprocatory movement; said piston comprising a crown section, an elongated skirt integral with and depending from said crown section and delimiting the underside thereof, said skirt section having an exterior thrust area delimited by a pair of undercut top and bottom shoulder-like edges angular disposed relative to the direction of said piston within said cylinder, and a pair of opposed open side edges interconnecting said shoulder-like edges, and an insert of wear-resistant material mounted on the thrust area of said skirt section; said insert having a central portion protruding beyond the exterior surface of said skirt section and slidably engaging the interior surface of said cylinder, and bevelled upper and lower edges engaging the corresponding undercut top and bottom shoulder-like edges of said thrust area; said insert being assembled on and disassembled from said thrust area only upon lateral sliding movement through an open side when said piston has been moved to an inoperative position wherein the entire thrust area is disposed beyond the end limit of said cylinder, said insert and piston moving as a unit when said piston is reciprocating within said cylinder.

8. The elongated cylinder and piston combination of claim 7 wherein the cylinder comprises a liner having an exterior surface defining a wet wall of a chamber for a liquid coolant encompassing said liner; said skirt section thrust area including at least one transversely extending slot having a base surface delimited by said undercut top and bottom shoulder-like edges and elongated open sides interconnecting said top and bottom edges; said top shoulder-like edge being spaced from said piston crown section and said bottom shoulder-like edge being spaced from the lower end limit of said skirt section.

9. The elongated cylinder and piston combination of claim 8 wherein the base surface of said slot is of planar configuration and said skirt section is provided with aligned wrist pin boss means having the axis of alignment thereof transversely disposed relative to the direction of movement of said piston within the cylinder liner and substantially parallel to the plane of said slot base surface.

10. The elongated cylinder and piston combination of claim 8 wherein the cross-sectional configuration of said insert taken through a plane transverse to the direction of movement of said piston defines a substantial spherical segment.

11. The elongated cylinder and piston combination of claim 8 wherein the bevelled upper and lower edges of said insert piece are shaped to conform substantially to the profile of the corresponding undercut top and bottom shoulder like edges of said slot.

12. The elongated cylinder and piston combination of claim 8 wherein the exterior of said skirt section is provided with a second slot similar to said first-mentioned slot and disposed substantially diametrically opposite thereto; and a second insert similar to said first-mentioned insert is disposed within said second slot; both of said inserts being in continuous sliding engagement with the cylinder liner interior surface upon reciprocatory movement of said piston within said liner.

13. The elongated cylinder and piston combination of claim 8 wherein the base surface of the slot has a substantially planar configuration and the depth of the portion of the base surface adjacent the undercut top shoulder-like edge of the slot is greater than the depth of the corresponding portion of the base surface adjacent the bottom edge of the slot; corresponding top and bottom portions of the insert being of substantially the same thickness.

14. The elongated cylinder and piston combination of claim 8 wherein the base surface of the slot has a substantially planar configuration and the depth of corresponding portions of the slot adjacent the undercut top and bottom shoulder-like edges of the slot is substantially uniform; the thickness of the portion of the insert adjacent the top edge of the slot is less than the thickness of the corresponding portion of the insert adjacent the bottom edge of the slot, the top and bottom edges of the slot being in nonparallel relation whereby one open side of the slot has a greater length, the bevelled upper and lower edges of the insert having a corresponding nonparallel relation and the side edges of the insert having substantially the same length as the corresponding open sides of the slot.

15. The elongated cylinder and piston combination of claim 8 wherein the base surface of the slot has a convex configuration and the insert has a concave interior surface corresponding to the convexity of the slot base surface and a convex exterior surface protruding from the exterior of the skirt section.

16. The elongated cylinder and piston combination of claim 15 wherein the radius of curvature of the exterior surface of the insert is less than the radius of curvature of the interior surface thereof.

17. The elongated cylinder and piston combination of claim 8 wherein said insert is formed from an organic polymer.

18. The elongated cylinder and piston combination of claim 17 wherein said polymer is selected from the class consisting of polyimides and fluorine-containing polymers.

19. The elongated cylinder and piston combination of claim 18 wherein said polymer includes a lubricant or metal filler.

20. The elongated cylinder and piston combination of claim 19 wherein said polymer is polytetrafluoroethylene filled with molybdenum disulfide and bronze.

* * * * *

UNITED STATES PATENT OFFICE
CERTIFICATE OF CORRECTION

PATENT NO. : 3,906,923
DATED : September 23, 1975

Page 1 of 2

INVENTOR(S) : Harry E. Harker

It is certified that error appears in the above—identified patent and that said Letters Patent are hereby corrected as shown below:

Col. 1, line 10 - "inordiante" should be --inordinate--

Line 31 - "th" should be --the--

Line 40 - Before "control" insert --cavitation--

Line 64 - Before "cylinder" insert --and--

Col. 2, line 2 - "teh" should be --the--

Line 19 - After "wall" insert --when--

Line 24 - Before "still" insert --a--

Line 27 - Before "still" insert --a--

Line 33 - "in" should be --on--

Line 42 - "connectings" should be --connecting--

Line 58 - After "cylinder" insert --liner--

Col. 3, line 19 - "on" should be --of--

Line 62 - "accomodated" should be --accommodated--

UNITED STATES PATENT OFFICE
CERTIFICATE OF CORRECTION

PATENT NO. : 3,906,923
DATED : September 23, 1975
INVENTOR(S) : Harry E. Harker

It is certified that error appears in the above-identified patent and that said Letters Patent are hereby corrected as shown below:

Col. 5, line 4 - "choises" should be --choices--

Col. 6, line 32 - "weat" should be --wear--

Line 34 - "piston" should be --pistons--

Col. 7, line 32 CLAIM 3 - "movmement" should be --movement--

Col. 8, line 1 CLAIM 7 - "and" should be --an--

Signed and Sealed this tenth Day of February 1976

[SEAL]

Attest:

RUTH C. MASON
Attesting Officer

C. MARSHALL DANN
Commissioner of Patents and Trademarks